(12) United States Patent
Oikawa et al.

(10) Patent No.: US 8,406,578 B2
(45) Date of Patent: Mar. 26, 2013

(54) MACH-ZEHNDER WAVEGUIDE TYPE OPTICAL MODULATOR

(75) Inventors: Satoshi Oikawa, Chiyoda-ku (JP); Katsutoshi Kondou, Chiyoda-ku (JP); Masayuki Ichioka, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 219 days.

(21) Appl. No.: 12/736,335

(22) PCT Filed: Mar. 6, 2009

(86) PCT No.: PCT/JP2009/054256
§ 371 (c)(1),
(2), (4) Date: Jan. 10, 2011

(87) PCT Pub. No.: WO2009/122852
PCT Pub. Date: Oct. 8, 2009

(65) Prior Publication Data
US 2011/0103735 A1 May 5, 2011

(30) Foreign Application Priority Data
Mar. 31, 2008 (JP) ................................. 2008-094320

(51) Int. Cl.
*G02F 1/035* (2006.01)
(52) U.S. Cl. ............................................................ 385/3
(58) Field of Classification Search .................. None
See application file for complete search history.

(56) References Cited

U.S. PATENT DOCUMENTS

| | | | |
|---|---|---|---|
| 7,035,485 B2 | 4/2006 | Kondo et al. | |
| 7,310,453 B2 | 12/2007 | Ichikawa et al. | |
| 2005/0180694 A1 * | 8/2005 | Sugiyama et al. | ............. 385/40 |
| 2007/0053625 A1 | 3/2007 | Ichioka et al. | |
| 2007/0104407 A1 | 5/2007 | Mitomi et al. | |
| 2008/0212915 A1 * | 9/2008 | Ichikawa et al. | .................. 385/3 |
| 2009/0097101 A1 * | 4/2009 | Hasegawa et al. | ............ 359/325 |

(Continued)

FOREIGN PATENT DOCUMENTS

| | | |
|---|---|---|
| JP | 1-018121 A | 1/1989 |
| JP | 5-297333 A | 11/1993 |

(Continued)

*Primary Examiner* — Sung Pak
(74) *Attorney, Agent, or Firm* — Chapman and Cutler LLP

(57) ABSTRACT

It is intended to suppress the influence of a photorefractive phenomenon or the coupling of stray light to signal light. A Mach-Zehnder waveguide type optical modulator is provided which includes a thin plate 1 with a thickness of 20 μm or less formed of a material having an electro-optical effect, an optical waveguide 2 formed on a front surface or a rear surface of the thin plate, and a modulation electrode modulating light passing through the optical waveguide. The optical waveguide includes an input optical waveguide 21, branched optical waveguides 23 to 28, and an output optical waveguide 30. The branched optical waveguide includes an input branching portion (region B) in which the input optical waveguide is branched into a plurality of optical waveguides, an output merging portion (region D) in which the plurality of optical waveguides connected to the output optical waveguide are merged, and a parallel portion (region C) formed between the input branching portion and the output merging portion. At least one of the input branching portion and the output merging portion has a ratio l/d of a length l along a symmetry axis of the branched optical waveguides to a gap d of the optical waveguide in the parallel portion in the range of 33 to 100.

10 Claims, 3 Drawing Sheets

U.S. PATENT DOCUMENTS

2009/0297086 A1    12/2009    Sugamata et al.
2009/0324157 A1*   12/2009    Sugiyama ........................ 385/2

FOREIGN PATENT DOCUMENTS

| | | |
|---|---|---|
| JP | 6-250131 A | 9/1994 |
| JP | 2003-215519 A | 7/2003 |
| JP | 2004-004589 A | 1/2004 |
| JP | 2004-093905 A | 3/2004 |
| JP | 2005-141156 A | 6/2005 |
| JP | 2006-276518 A | 10/2006 |
| JP | 2007-133135 A | 5/2007 |
| WO | WO 2007/122877 A1 | 11/2007 |

* cited by examiner (a)

(b)

(a)

(b)

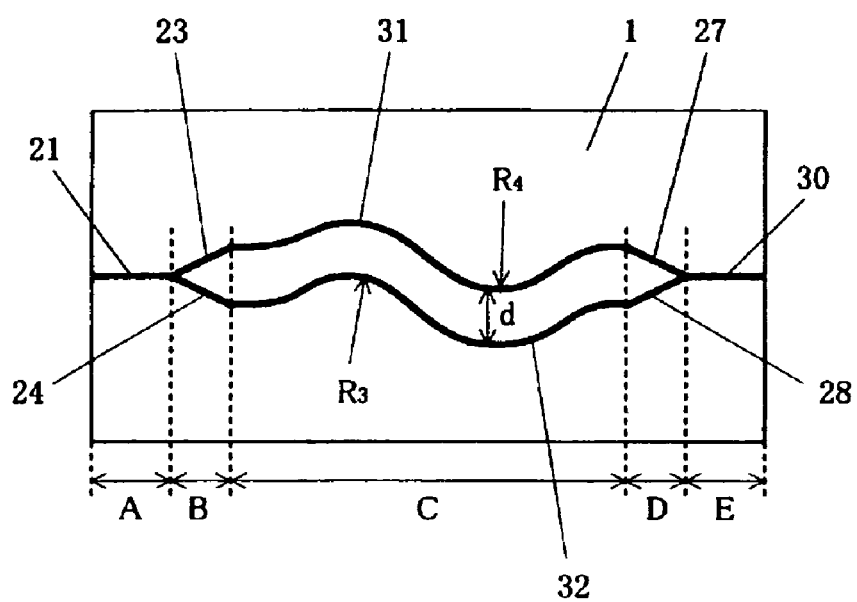

MACH-ZEHNDER WAVEGUIDE TYPE OPTICAL MODULATOR

TECHNICAL FIELD

The present invention relates to a Mach-Zehnder waveguide type optical modulator, and more particularly, to a Mach-Zehnder waveguide type optical modulator including a thin plate with a thickness of 20 μm or less formed of a material having an electro-optical effect.

BACKGROUND ART

In the fields of optical communications or optical measurements, optical modulators have been widely used. Particularly, with the development of multimedia, the amount of information being transmitted tends to increase and there is a demand for enlargement in the modulation frequency bandwidth of optical modulators. As one means for fulfilling the demand, an external modulation system as a waveguide type optical modulator in which an optical waveguide or a modulation electrode is formed on a substrate formed of lithium niobate (LN) or the like having an electro-optical effect has been employed and the diversification thereof has proceeded. For the purpose of the enlargement in frequency bandwidth in the external modulation system, it is necessary to accomplish the rate matching of a microwave as a modulation signal with an optical wave and a decrease in driving voltage.

Accordingly, by reducing the thickness of the substrate having an electro-optical effect, attempts have been made to satisfy the rate matching condition of a micro wave with an optical wave and to simultaneously reduce the driving voltage.

In Patent Citations 1 and 2, an optical waveguide and a modulation electrode are formed in a thin substrate with a thickness of 30 μm or less and a reinforcement plate with a lower dielectric constant than that of the substrate is bonded to the substrate to lower the effective refractive index with respect to microwaves, thereby accomplishing the rate matching of the microwaves with optical waves and enhancing the mechanical strength of the substrate.

Patent Citation 1: Japanese Patent Application Laid-Open No. 64-18121
Patent Citation 2: Japanese Patent Application Laid-Open No. 2003-215519

However, in a wide-bandwidth optical modulator, for example, an optical modulator corresponding to 40 GHz, when the optical input power input to the optical modulator is enhanced for the purpose of transmission over a long distance, problems occur such as a decrease in extinction ratio, an increase in optical loss, and a variation in bias point. Particularly, when the optical input power is equal to or greater than 10 mW, these problems become marked. As a result of extensive research, the inventors found that the problems are caused by signal light propagating in the optical waveguide interfering with stray light generated in an input portion for inputting a laser beam to the optical modulator, the optical waveguide in the optical modulator causing a photorefractive phenomenon, and a grating being formed in the optical waveguide portion. The grating formed in the optical waveguide portion returns the signal light traveling in the optical waveguide in the opposite direction of the traveling direction or reflects the signal light to the outside of the optical waveguide, thereby causing a decrease in extinction ratio of the signal light. The decrease in extinction ratio is also caused because the stray light is coupled to the signal light propagated in the optical waveguide.

The photorefractive phenomenon is a phenomenon in which the refractive index of a material varies due to contact with light. Specifically, when a spatial light intensity distribution is caused by optical interference on the basis of the characteristic that charges in the material migrate due to the light, the charges are re-distributed due to the light intensity distribution and the internal electric field varies locally due to the eccentric distribution of charges. Since the internal electric field changes the refractive index of a material, the refractive index distribution of the material corresponding to the light intensity distribution is formed as a result.

Since the photorefractive phenomenon has a characteristic that the refractive index gradually varies and the scattering gains strength with the passing of time when the material is in continuous contact with light, the deterioration of the characteristics of the optical modulator such as the decrease in extinction ratio and the increase in optical loss is marked after driving the optical modulator for a long time.

As means for solving such problems, Patent Citation 3 discloses that stray light removing means is disposed on the surface of a substrate to suppress the decrease in extinction ratio and the increase in optical loss due to the photorefractive phenomenon in the optical waveguide.

Patent Citation 3: Japanese Patent Application Laid-Open No. 2004-93905

On the other hand, when the thickness of the substrate is set to 30 μm or less or 20 μm or less as in Patent Citations 1 and 2, the density of the stray light confined in the substrate increases and it is thus not possible to satisfactorily suppress the deterioration in characteristics of the optical modulator such as the decrease in extinction ratio and the increase in optical loss only by the use of the stray light removing means described in Patent Citation 3, compared with the optical waveguide type modulator with a thickness of a substrate of about 1 to 0.5 mm. In a Mach-Zehnder waveguide, a section (input branching portion) until branched waveguides obtained by branching an optical waveguide are guided to a parallel orientation or a section (output merging portion) until the parallel branched waveguides are merged is gradually curved (with the minimum radius of curvature of about 150 mm) so as to cause optical waves not to leak from the optical waveguide. Accordingly, such a portion often comes in contact with stray light and thus is much influenced by the photorefractive phenomenon. When the length of the portion (operating portion) of the optical waveguide on which the electric field formed by a modulation electrode acts increases, the photorefractive phenomenon has a great influence on the optical waveguide. Accordingly, reduction of the influence of the photorefractive phenomenon on the Mach-Zehnder waveguide type optical modulator is an important issue.

When the Mach-Zehnder waveguide is formed in a thin plate, the optical waves propagated in the branched waveguides are flattened by the light confinement action of the thin plate. Accordingly, to avoid crosstalk between the branched waveguides, it is necessary to increase the distance between the branched waveguides, whereby the length of the input branching portion or the output merging portion further increases. This means that the influence of the photorefractive phenomenon is greater.

DISCLOSURE OF INVENTION

Technical Problem

An object of the invention is to provide a Mach-Zehnder waveguide type optical modulator that can suppress the influence of the photorefractive phenomenon or the interference of the stray light with the signal light and ameliorate the increase in optical loss or the decrease in extinction ratio, even when a substrate with a thickness of 20 μm or less is used.

Technical Solution

As a result of extensive research to accomplish the above-mentioned object, the inventors found that by taking advantage of the fact that the confinement of light becomes stronger as the thickness of the substrate decreases, the length of the optical waveguide in a predetermined direction is reduced, whereby it is possible to suppress the influence of the photo-refractive phenomenon or the coupling of stray light to signal light.

According to a first aspect of the invention, there is provided a Mach-Zehnder waveguide type optical modulator including a thin plate with a thickness of 20 μm or less formed of a material having an electro-optical effect, an optical waveguide formed on a front surface or a rear surface of the thin plate, and a modulation electrode modulating light passing through the optical waveguide, wherein the optical waveguide includes an input optical waveguide, branched optical waveguides, and an output optical waveguide, wherein the branched optical waveguide includes an input branching portion in which the input optical waveguide is branched into a plurality of optical waveguides, an output merging portion in which the plurality of optical waveguides connected to the output optical waveguide is merged, and a parallel portion formed between the input branching portion and the output merging portion, and wherein at least one of the input branching portion and the output merging portion has a ratio l/d of a length l along a symmetry axis of the branched optical waveguides to a gap d of the optical waveguide in the parallel portion in the range of 33 to 100.

The "Mach-Zehnder waveguide type optical modulator" means an optical modulator in which a Mach-Zehnder waveguide is formed in at least a part of an optical waveguide formed in the optical modulator and is not limited to, for example, an optical modulator in which a single Mach-Zehnder waveguide is formed in the optical modulator, but includes a so-called nest type waveguide in which other Mach-Zehnder waveguides (sub MZ waveguides) are formed in a nest shape in two branched waveguides in a single Mach-Zehnder waveguide (main MZ waveguide).

A second aspect of the invention provides the Mach-Zehnder waveguide type optical modulator according to the first aspect, wherein a curved portion of the optical waveguide of at least one of the input branching portion and the output merging portion has a minimum radius of curvature R of 0.2 to 100 mm.

A third aspect of the invention provides the Mach-Zehnder waveguide type optical modulator according to the first or second aspects, wherein at least a part of the parallel portion includes a curved portion and the curved portion has a minimum radius of curvature R of 0.2 to 100 mm.

A fourth aspect of the invention provides the Mach-Zehnder waveguide type optical modulator according to any one of the first to third aspects, wherein a part of the optical waveguide has a ridge structure.

A fifth aspect of the invention provides the Mach-Zehnder waveguide type optical modulator according to the fourth aspect, wherein the ridge structure is formed in at least a part of the optical waveguide having a minimum radius of curvature.

Advantageous Effects

According to the configuration described in the first aspect of the invention, the Mach-Zehnder waveguide type optical modulator includes the thin plate with a thickness of 20 μm or less formed of a material having an electro-optical effect, the optical waveguide formed on a front surface or a rear surface of the thin plate, and the modulation electrode modulating light passing through the optical waveguide, wherein the optical waveguide includes an input optical waveguide, branched optical waveguides, and an output optical waveguide, wherein the branched optical waveguide includes an input branching portion in which the input optical waveguide is branched into a plurality of optical waveguides, an output merging portion in which the plurality of optical waveguides connected to the output optical waveguide is merged, and a parallel portion formed between the input branching portion and the output merging portion, and wherein at least one of the input branching portion and the output merging portion has a ratio l/d of a length l along a symmetry axis of the branched optical waveguides to a gap d of the optical waveguide in the parallel portion in the range of 33 to 100. Accordingly, for example, when a Mach-Zehnder waveguide with an optical waveguide gap d of 30 μm is formed, the length l of the input branching portion or the output merging portion along the symmetry axis of the branched optical waveguides was 4 mm in the past, which is about 120 times the optical waveguide gap d, but can be reduced to 1 mm in the invention. By this reduction, it is possible to further shorten the part of the optical waveguide which is influenced by the photorefractive phenomenon or in which stray light is coupled to signal light. In addition, it is possible to suppress the optical loss due to the stray light in that part or the decrease in extinction ratio.

By employing this configuration, it is also possible to reduce the entire size of the Mach-Zehnder waveguide type optical modulator.

According to the configuration described in the second aspect of the invention, since the curved portion of the optical waveguide in at least one of the input branching portion and the output merging portion has a minimum radius of curvature R of 0.2 to 100 mm, it is possible to reduce the length l of the input branching portion or the output merging portion along the symmetry axis of the branched optical waveguides. Particularly, when the gap between two branched waveguides of the Mach-Zehnder waveguide is enlarged to prevent the crosstalk, it is possible to effectively reduce the length l.

According to the configuration described in the third aspect of the invention, since at least a part of the parallel portion includes a curved portion and the curved portion has a minimum radius of curvature R of 0.2 to 100 mm, it is possible to reduce the length of the parallel portion (the distance between the start point and the end point of the parallel portion), as well as the input branching portion or the output merging portion. Accordingly, it is possible to suppress the influence of the photorefractive phenomenon or the coupling of stray light to signal light and to reduce the size of the optical modulator.

According to the configuration described in the fourth aspect of the invention, since a part of the optical waveguide has a ridge structure, it is possible to enlarge the difference in refractive index between the optical waveguide and the periphery thereof and thus to improve the confinement of light in the curved portion. Accordingly, it is possible to suppress leakage from the curved portion of the optical waveguide and to sufficiently satisfy the conditions such as the relation of the above-mentioned ratio l/d or the minimum radius of curvature R.

According to the configuration described in the fifth aspect of the invention, since the ridge structure is formed in at least a part of the optical waveguide having a minimum radius of curvature, it is possible to effectively suppress the leakage of light from the part having the minimum radius of curvature. Accordingly, it is possible to make the optical waveguide compact and it is also possible to not only suppress the influence of the photorefractive phenomenon or the coupling of stray light to signal light, but to reduce the generation of stray light itself as the cause thereof.

BRIEF DESCRIPTION OF THE DRAWINGS

FIG. 5 is a diagram illustrating an optical modulator in which a parallel portion of a Mach-Zehnder waveguide meanders.

| | |
|---|---|
| 1: | SUBSTRATE |
| 2: | OPTICAL WAVEGUIDE |
| 4: | ADHESIVE LAYER |
| 5: | REINFORCEMENT PLATE |
| 6: | BUFFER LAYER |
| 7: | SIGNAL ELECTRODE |
| 8: | GROUND ELECTRODE |
| 21: | INPUT OPTICAL WAVEGUIDE |
| 22: | BRANCHING POINT |
| 23~28: | BRANCHED WAVEGUIDE |
| 29: | MERGING POINT |
| 30: | OUTPUT OPTICAL WAVEGUIDE |

BEST MODE FOR CARRYING OUT THE INVENTION

Hereinafter, exemplary embodiments of the invention will be described in detail.

Figure 1:
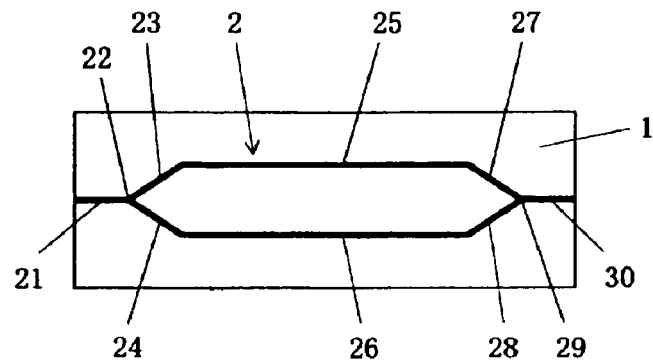
FIG. 1 is a plan view schematically illustrating an optical modulator including a single Mach-Zehnder waveguide.
Figure 1:
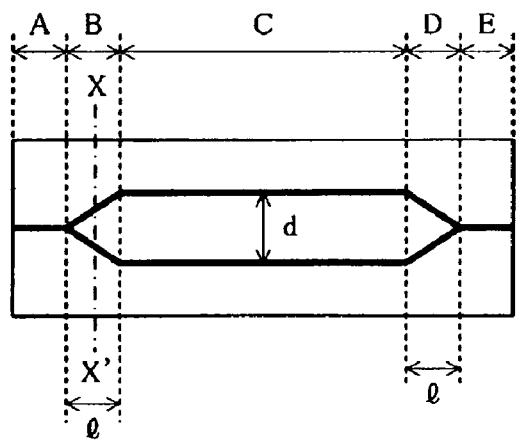

FIG. 1 shows an example of a Mach-Zehnder waveguide type optical modulator according to the invention. FIGS. 1(a) and 1(b) are the same diagram, where FIG. 1(a) shows constituent portions of an optical waveguide and FIG. 1(b) shows constituent regions of the optical waveguide, which are clearly described in the invention.

The invention provides a Mach-Zehnder waveguide type optical modulator including a thin plate 1 with a thickness of 20 μm or less formed of a material having an electro-optical effect, an optical waveguide 2 formed on a front surface or a rear surface of, the thin plate, and a modulation electrode (not shown) modulating light passing through the optical waveguide, wherein the optical waveguide includes an input optical waveguide (21, region A), branched optical waveguides (23 to 28, regions B to D), and an output optical waveguide (30, region E), wherein the branched optical waveguide includes an input branching portion (region B) in which the input optical waveguide is branched into a plurality of optical waveguides, an output merging portion (region D) in which the plurality of optical waveguides connected to the output optical waveguide is merged, and a parallel portion (region C) formed between the input branching portion and the output merging portion, and wherein at least one of the input branching portion and the output merging portion has a ratio l/d of a length l along a symmetry axis of the branched optical waveguides to a gap d of the optical waveguide in the parallel portion in the range of 33 to 100 and more preferably in the range of 35 to 70.

Regarding the "the symmetry axis of the branched optical waveguides" in the invention, the symmetry axis of branched waveguides 23 and 24 in FIG. 1 corresponds to an extension line of an input optical waveguide 21. In FIG. 1, a straight line connecting a branching point 22 and a merging point 29 may be considered as the symmetry axis. Therefore, in FIG. 1, the length of the input branching portion along the symmetry axis of the branched optical waveguides corresponds to the length l indicated in region B of FIG. 1(b), and the length l of the output merging portion along the symmetry axis of the branched optical waveguides corresponds to the length l indicated in region D of FIG. 1(b).

Examples of the material of the substrate having an electro-optical effect include lithium niobate, lithium tantalate, and a combination thereof. Particularly, crystals of lithium niobate (LN) having a high electro-optical effect can be suitably used.

Figure 3:
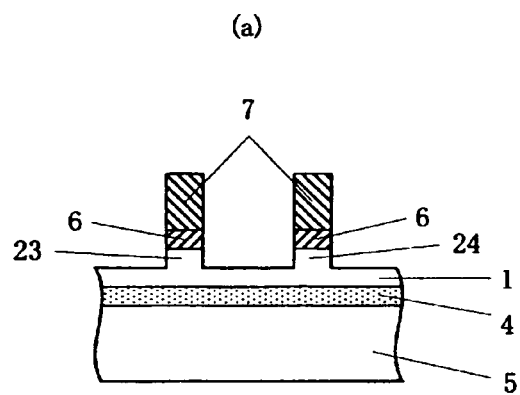
FIG. 3 is a sectional view of the optical modulator taken along one-dot dashed line X-X' of FIG. 1(b).
Figure 3:
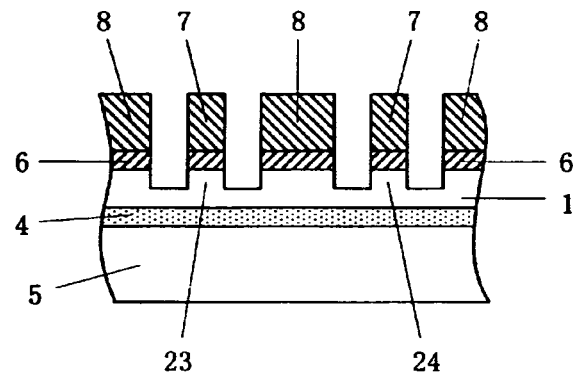

As a method of forming an optical waveguide on a substrate, a method of diffusing Ti or the like into the front surface or rear surface of the substrate using a thermal diffusion method or a proton-exchange method can be used, but as shown in FIG. 3, ridge portions may be formed on the substrate 1 and the ridge portions may be used as the optical waveguides 23 and 24 for guiding light without using the thermal diffusion method or the proton-exchange method. The thermal diffusion method or the proton-exchange method using Ti and the ridge structure may be used together.

Regarding the optical waveguide using the ridge structure, as shown in FIG. 3(a), convex portions are formed only in portions corresponding to the optical waveguides 23 and 24 and the other portions are formed lower than the optical waveguides. In addition, as shown in FIG. 3(b), grooves may be formed on both sides of regions corresponding to the optical waveguides 23 and 24 to form the optical waveguides. Here, FIG. 3 is a sectional view of the optical modulator taken along one-dot dashed line X-X' of FIG. 1(b).

In any case, a modulation electrode such as a signal electrode 7 or a ground electrode 8 is formed on the optical waveguides or on the substrate in the vicinity thereof, and the modulation electrodes can be formed using a method of forming a Ti or Au electrode pattern and a gold plating method. The optical waveguides may be formed on the rear surface of the substrate 1 and the modulation electrodes may be formed on the rear surface or on the front surface opposite to the optical waveguides.

To prevent optical waves propagated in the optical waveguides 23 and 24 from being absorbed and scattered by the electrodes 7 and 8, a buffer layer 6 of dielectric $SiO_2$ or the like may be disposed between the optical waveguides (or the substrate) and the electrodes.

In the invention, since the substrate 1 formed of the material having an electro-optical effect is a thin plate with a thickness of 20 μm or less, the mechanical strength is insufficient. To compensate for this, a reinforcement plate 5 is bonded to the substrate 1 with an adhesive layer 4 interposed therebetween.

A variety of materials can be used as the material of the reinforcement plate. For example, in addition to the material of the thin plate, materials having a lower dielectric constant than that of the thin plate, such as quartz, glass, and alumina, or materials having a crystal orientation other than that of the thin plate may be used. Here, in view of the stabilization of, a modulation characteristic of the optical modulator with variation in temperature, it is preferable that a material having a linear expansion coefficient equivalent to that of the thin plate is selected. When it is difficult to select the equivalent material, a material having a linear expansion coefficient equivalent to that of the thin plate is selected as an adhesive for bonding the thin plate to the reinforcement plate like Patent Citation 2.

Examples of the adhesive layer 4 for bonding the thin plate 1 to the reinforcement plate 5 include a variety of adhesive materials such as an epoxy adhesive, a thermosetting adhesive, a UV-curable adhesive, a soldering glass, and thermosetting, light-curable, or light-thickening resin adhesives. The thin plate and the reinforcement plate may be directly bonded to each other using a direct bonding method without using an adhesive.

A method of forming the optical waveguide and the modulation electrodes on a substrate with a thickness of several hundred μm and grinding the rear surface of the substrate to finish the substrate with a thickness of, for example, 20 μm or less can be used to manufacture the thin plate of the optical modulator. The optical waveguide and the modulation electrodes can be formed after manufacturing the thin plate. However, since there is a risk that a thermal impact at the time of forming the optical waveguide or a mechanical impact due to treatment at the time of performing various processes may result and cause damage to the thin plate, it is preferable that the rear surface of the substrate is ground after forming the optical waveguide and the modulation electrodes.

In the Mach-Zehnder waveguide type optical modulator according to the invention, at least one of the input branching portion and the output merging portion has a ratio l/d of the length l along the symmetry axis of the branched optical waveguides to the gap d between the optical waveguides in the parallel portion in the range of 33 to 100 and more preferably in the range of 35 to 70, as shown in FIG. 1(b). When the gap d in the parallel portion is excessively small, optical crosstalk may occur between the optical waveguides in the parallel portion, thereby causing the optical loss or the decrease in extinction ratio. Accordingly, the gap d in the parallel portion needs to be set to such a distance that optical waves propagated in the branched waveguides do not generate crosstalk. For example, when a substrate with a thickness of 20 μm or less is used, the gap d needs to be set to 25 μm or more.

When the ratio l/d is smaller than 33, the curve of the optical waveguides (23 and 34 or 27 and 28) in the input branching portion (region B) or the output merging portion (region D) is rapid. Accordingly, the optical waves may leak from the optical waveguides, thereby causing the optical loss or the decrease in extinction ratio due to the leakage in addition to the photorefractive phenomenon.

On the other hand, when the ratio l/d is greater than 100, the effect of suppressing the influence of the photorefractive phenomenon or the coupling of the stray light to the signal light is not sufficient, whereby it is not possible to sufficiently improve the optical loss or the decrease in extinction ratio.

Figure 2:
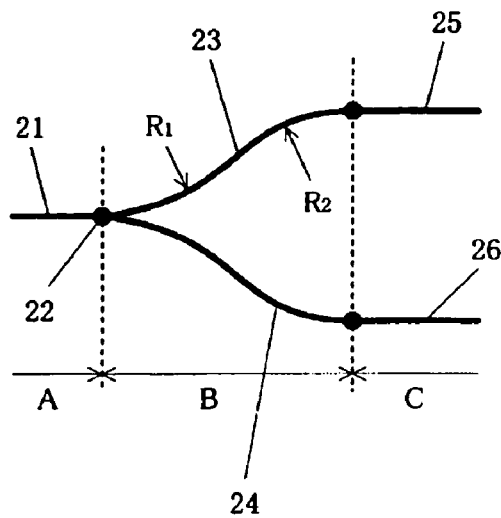
FIG. 2 is a diagram illustrating the shape of an optical waveguide in an input branching portion of the Mach-Zehnder waveguide.

The shape of the optical waveguides (for example, 23 and 24) in the input branching portion (region B) or the output merging portion (region D) includes plural curved portions (radii of curvature R1 and R2), the enlarged view of which is shown in FIG. 2. When the radius of curvature in the curved portions is excessively small, the leakage of optical waves from the optical waveguides may be caused and thus the minimum radius of curvature is set. In the invention, in a place where the thickness of the substrate 1 is 20 μm or less, the minimum radius of curvature R can be realized in the range of 0.2 to 100 mm. The solid circles including a branching point 22 in FIG. 2 explicitly show a connection point of the input optical waveguide (21, region A) and the input branching portion (branched waveguides 23 and 24, region B) and connection points of the input branching portion and the parallel portion (region C), and are not associated with the shape of the optical waveguide.

When the radius of curvature R is smaller than 0.2 mm, the leakage of optical waves from the optical waveguide may be caused even in the substrate 1 with a thickness of 20 μm or less. When the radius of curvature R is greater than 100 mm, the length l is not reduced, and the size of the optical waveguide increases. Accordingly, the influence of the photorefractive phenomenon or the coupling of the stray light to the signal light increases and the optical loss or the decrease in extinction ratio occurs, thereby making it difficult to reduce the size of the optical modulator.

When it is intended to reduce the radius of curvature R, it is preferable that the refractive index of the periphery of the optical waveguide is set to be lower than that of the optical waveguide. Accordingly, as shown in FIG. 3, it is preferable that the optical waveguide having the ridge structure is formed.

The minimum radius of curvature is associated with the height of the convex portion of the ridge structure. When the optical waveguide is formed using the ridge structure with the height of the convex portion of about 2 μm, the minimum radius of curvature R is 0.2 mm.

On the contrary, when the optical waveguide is formed using the thermal diffusion method of Ti or the like, the minimum radius of curvature R in the substrate with a thickness of 20 μm is 30 mm.

As shown in FIG. 5, an optical waveguide in which the parallel portion (region C) meanders may be formed using the minimum radius of curvature R. In FIG. 5, the parallel portion has a structure in which plural curved portions (radii of curvature R3 and R4) are joined together and formed while the gap d between the branched waveguides is maintained. The minimum radius of curvature R in the parallel portion is set to the range of 0.2 to 100 mm. As described above, the ridge structure may be selectively employed.

Figure 4:
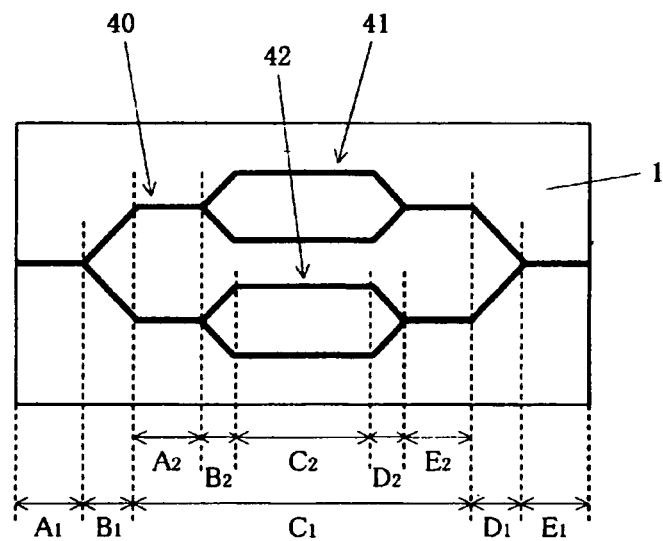
FIG. 4 is a plan view schematically illustrating a Mach-Zehnder waveguide type optical modulator including a nest waveguide.

The Mach-Zehnder waveguide included in the optical modulator according to the invention is not limited to a single Mach-Zehnder waveguide shown in FIG. 1 and the like, but may include a so-called nest type waveguide in which other Mach-Zehnder waveguides (sub MZ waveguides) are formed in a nest shape in two branched waveguides in a single Mach-Zehnder waveguide (main MZ waveguide), as shown in FIG. 4.

The main MZ waveguide 40 shown in FIG. 4 includes an input optical waveguide (region A1), an input branching portion (region B1), a parallel portion (portions of region C1 other than regions B2 to D2 of the sub MZ waveguides), an output merging portion (region D1), and an output optical waveguide (region E1).

In the sub MZ waveguides 41 and 42, region C1 is further divided into sub portions, that is, an input optical waveguide (region A2), an input branching portion (region B2), a parallel portion (region C2), an output merging portion (region D2), and an output optical waveguide (region E2).

A characteristic of the invention is that the ratio l/d of the length l of the input branching portion or the output merging portion along the symmetry axis of the branched waveguides to the gap d between the branched waveguides in the parallel portion may be satisfied by any one of the main MZ waveguide or the sub MZ waveguides. Accordingly, it is possible to accomplish the compactness of the optical waveguide in a part to which the invention is applied and to suppress the influence of the photorefractive phenomenon or the coupling of the stray light to the signal light, thereby contributing to the decrease in size of the entire optical modulator.

EXAMPLES

Specific examples of the Mach-Zehnder waveguide type optical modulator according to the invention and a test thereof will be described.

Example 1

In an optical modulator according to Example 1, an X-cut LN substrate with a thickness of 500 µm is used as a substrate and an optical waveguide is formed on the surface of the substrate using a Ti diffusion process. The shape of the Mach-Zehnder optical waveguide shown in FIG. 1 is employed as the shape of the optical waveguide. The lengths of the input optical waveguide 21 and the output optical waveguide 30 are about 5 mm, the lengths l of the input branching portion (region B) and the output merging portion (region D) along the symmetry axis are about 3 mm, the length of the parallel portion (region C) is 30 mm, and the gap d between the branched waveguides in the parallel portion is 30 µm. The minimum radius of curvature R in regions B and D is set to 100 mm.

Then, the rear surface of the substrate is ground until the thickness of the substrate becomes 10 µm, and is bonded to a reinforcement plate using a UV-curable adhesive as an adhesive layer. The modulation electrodes are formed on the surface of the substrate using a plating process.

Examples 2 to 4

In Examples 2 to 4, a Mach-Zehnder waveguide type optical modulator is formed in the same way as Example 1 except that the length l, the gap d between the branched waveguides, and the minimum radius of curvature R in Example 1 are changed as shown in Table 1.

Example 5

In an optical modulator according to Example 5, a Z-cut LN substrate with a thickness of 500 µm is used as a substrate and an optical waveguide is formed on the surface of the substrate using a Ti diffusion process. Then, the rear surface of the substrate is ground by the use of a grinder until the thickness of the substrate becomes 5 µm, and is bonded to a reinforcement plate using a UV-curable adhesive as an adhesive layer. The shape of the Mach-Zehnder optical waveguide shown in FIG. 1 is employed as the shape of the optical waveguide. The lengths of the input optical waveguide 21 and the output optical waveguide 30 are about 4 mm, the lengths l of the input branching portion (region B) and the output merging portion (region D) along the symmetry axis are about 0.825 mm, the length of the parallel portion (region C) is 35 mm, the gap d between the branched waveguides in the parallel portion is 25 µm, and the minimum radius of curvature R is 0.2 mm. The optical waveguides of the input branching portion and the output merging portion having a curved portion have the ridge structure (where the height of the ridge is 2 µm) shown in FIG. 3(b).

Then, a buffer layer is formed on the substrate including the optical waveguide and modulation electrodes are formed on the top surface of the buffer layer using a plating process.

Comparative Example

In an optical modulator according to a comparative example, an X-cut LN substrate with a thickness of 500 µm is used as a substrate and an optical waveguide is formed on the surface of the substrate using a Ti diffusion process. The shape of the Mach-Zehnder optical waveguide shown in FIG. 1 is employed as the shape of the optical waveguide. The lengths of the input optical waveguide 21 and the output optical waveguide 30 are about 5 mm, the lengths l of the input branching portion (region B) and the output merging portion (region D) along the symmetry axis are about 4 mm, the length of the parallel portion (region C) is 30 mm, the gap d between the branched waveguides in the parallel portion is 30 µm, and the minimum radius of curvature R is 150 mm.

Test

Optical fibers were connected to the optical modulators according to Examples 1 to 3 and the comparative example. The extinction ratios of the optical modulators were measured by the use of an optical power meter. The measurement results are shown in Table 1.

TABLE 1

| | l [mm] | d [µm] | R [mm] | l/d | Extinction Ratio [dB] |
|---|---|---|---|---|---|
| Example 1 | 3 | 30 | 100 | 100 | 30 |
| Example 2 | 1.5 | 30 | 70 | 50 | 33 |
| Example 3 | 2.4 | 35 | 35 | 70 | 31 |
| Example 4 | 1.5 | 43 | 30 | 35 | 33 |
| Example 5 (ridge structure) | 0.825 | 25 | 0.2 | 33 | 34 |
| Comparative Example | 4 | 30 | 150 | 133 | 25 |

It can be understood from the results shown in Table 1 that the extinction ratios of the optical modulators according to Examples 1 to 3 are improved by 30 dB or more, compared with the comparative example.

INDUSTRIAL APPLICABILITY

According to the invention, it is possible to provide a Mach-Zehnder waveguide type optical modulator that can suppress the influence of the photorefractive phenomenon or the coupling of stray light to signal light and improve the increase in optical loss or the decrease in extinction ratio, even when a substrate with a thickness of 20 µm or less is used.

The invention claimed is:
1. A Mach-Zehnder waveguide type optical modulator, comprising:
  a thin plate with a thickness of 20 µm or less formed of a material having an electro-optical effect,
  an optical waveguide formed on a front surface or a rear surface of the thin plate, and
  a modulation electrode modulating light passing through the optical waveguide,
  wherein the optical waveguide comprises an input optical waveguide, branched optical waveguides, and an output optical waveguide,
  wherein the branched optical waveguides comprise an input branching portion in which the input optical waveguide is branched into a plurality of optical waveguides, an output merging portion in which the plurality of optical waveguides connected to the output optical waveguide is merged, and a parallel portion formed between the input branching portion and the output merging portion, and
  wherein at least one of the input branching portion and the output merging portion has a ratio l/d of a length l along a symmetry axis of the branched optical waveguides to a gap d of the optical waveguide in the parallel portion in the range of 33 to 100.

2. The Mach-Zehnder waveguide type optical modulator according to claim 1, wherein a curved portion of the optical waveguide in at least one of the input branching portion and the output merging portion has a minimum radius of curvature R of 0.2 to 100 mm.

3. The Mach-Zehnder waveguide type optical modulator according to claim 1, wherein at least a part of the parallel portion includes a curved portion and the curved portion has a minimum radius of curvature R of 0.2 to 100 mm.

4. The Mach-Zehnder waveguide type optical modulator according to claim 1, wherein a part of the optical waveguide has a ridge structure.

5. The Mach-Zehnder waveguide type optical modulator according to claim 4, wherein the ridge structure is formed in at least a part of the optical waveguide having a minimum radius of curvature.

6. The Mach-Zehnder waveguide type optical modulator according to claim 2, wherein at least a part of the parallel portion includes a curved portion and the curved portion has a minimum radius of curvature R of 0.2 to 100 mm.

7. The Mach-Zehnder waveguide type optical modulator according to claim 2, wherein a part of the optical waveguide has a ridge structure.

8. The Mach-Zehnder waveguide type optical modulator according to claim 3, wherein a part of the optical waveguide has a ridge structure.

9. The Mach-Zehnder waveguide type optical modulator according to claim 7, wherein the ridge structure is formed in at least a part of the optical waveguide having a minimum radius of curvature.

10. The Mach-Zehnder waveguide type optical modulator according to claim 8, wherein the ridge structure is formed in at least a part of the optical waveguide having a minimum radius of curvature.

* * * * *